United States Patent Office.

RICHARD KIRCHHOFF AND EMIL HAUSSMANN, OF BERLIN, GERMANY, ASSIGNORS TO THE ACTIEN-GESELLSCHAFT FÜR ANILIN FABRIKATION, OF SAME PLACE.

BLACK SULFUR DYE.

SPECIFICATION forming part of Letters Patent No. 635,169, dated October 17, 1899.

Application filed August 11, 1899. Serial No. 726,865. (No specimens.)

*To all whom it may concern:*

Be it known that we, RICHARD KIRCHHOFF and EMIL HAUSSMANN, of Berlin, in the Kingdom of Prussia, German Empire, have invented new and useful Improvements in Black Dyes; and we do hereby declare that the following is a full, clear, and exact description thereof, which will enable others skilled in the art to which it appertains to make and use the same.

It is well known that by melting with sulfur and sulfids of alkali metals certain nitrooxy derivatives of diphenylamin there are obtained coloring-matters which directly produce on the fiber black tints without requiring a subsequent oxidation. A coloring-matter of this kind is brought upon the market under the name of "immedial-black." (Compare United States Letters Patents Nos. 610,541 and 625,717.) On the other hand, it has been shown that by melting meta-phenylenediamin or meta-toluylenediamin with sulfur and sulfids of alkali metals at a more elevated temperature (220° to 260°) brown to black dyestuffs are obtained. (United States Letters Patents Nos. 561,277 and 594,105.) At a lower temperature—say 140° to 160°—the aforesaid meta-diamins, according to our observations, do not at all yield a dyestuff when melted with sulfur and sulfids. We have now discovered that an unexpected reaction takes place if sulfur and sulfids of alkali metals are allowed to react on mixtures of equimolecular proportions of a meta-diamin and of a nitrooxy derivative of diphenylamin. When these substances are melted together at about 140° to 160°, a coloring-matter is formed which dyes cotton directly a dark green-black shade. The shades obtained are very much different from those obtained with immedial-black, the latter being more bluish black. As meta-phenylenediamin melted alone under the same conditions with sulfur and sulfid is not converted into a dyestuff, it might have been expected that the reaction would lead to the formation of a mixture of immedial-black and unchanged meta-phenylenediamin. The different properties of our new product and of immedial-black clearly prove, however, that under the conditions chosen the meta-diamin also enters into the reaction forming together with the nitrooxydiphenylamin derivative a new coloring-matter.

The following directions will explain in what manner we proceed in order to carry out our invention. Forty-eight parts, by weight, of sodium sulfid, seventeen parts of sulfur, and five parts of water are heated together, and to this mixture is added at 110° to 120° centigrade a mixture of ten parts of dinitrooxydiphenylamin and four parts of meta-phenylenediamin, (equimolecular proportions.) The formation of the coloring-matter commences at about 125° centigrade. The temperature is slowly raised up to 150° to 160° centigrade and maintained for about four to five hours. The dry melt is powdered and can be directly employed for dyeing. The product obtained in this way forms in dry state a black powder which readily dissolves in water with a dull greenish-blue color which on addition of caustic-soda lye turns slightly more bluish. The aqueous solution of the dye is precipitated when mineral acids or acetic acid is added, a brownish-black precipitate being formed. By the introduction of a current of air or carbonic acid into the aqueous solution of the dye a dark-blue precipitate is separated after some time. In concentrated sulfuric acid the dye dissolves slowly with dirty-green color, while in fuming sulfuric acid containing about twenty per cent. anhydride it dissolves with a bluish-black color.

The dye is practically insoluble in solvents such as alcohol, benzene, ether, nitrobenzene, &c.

Our new dye produces directly on unmordanted cotton black shades.

The following alterations may be made in the above example without materially changing the character of the product obtained. Instead of directly introducing the diamins into the reaction we may equally well use the corresponding nitro derivatives—that is to say, meta-nitranilin, meta-nitrotoluidin, or meta-dinitrobenzene and meta-dinitrotoluene, these substances being converted into the amido products by the action of sulfids during the melting process. Further, the quantities of sulfur and sodium sulfid in the above example may be varied within wide limits, and we do not confine ourseves to the figures given in the above example.

Having now described our invention and in what manner the same can be performed, what we claim as new is—

The black dye which results from heating equimolecular proportions of dinitroöxydiphenylamin and meta-phenylenediamin with sulfur and alkali sulfids, said dye being readily soluble in water containing a small portion of alkali sulfid with dull greenish-blue color, which on addition of caustic-soda lye turns slightly more bluish, the aqueous solution yielding on addition of mineral acids or acetic acid a brownish-black precipitate, while by introduction of a current of air or carbonic acid after some time a black precipitate is formed, dissolving in concentrated sulfuric acid with dirty green-black color, said dye producing on unmordanted cotton in an alkaline bath black shades of great intensity and fastness.

In witness whereof we have hereunto signed our names, this 21st day of July, 1899, in the presence of two subscribing witnesses.

RICHARD KIRCHHOFF.
EMIL HAUSSMANN.

Witnesses:
WALDEMAR HAUPT,
WILLIAM MAYNER.